(No Model.)

A. B. ARNOLD.
FELLY EXPANDER.

No. 536,167. Patented Mar. 19, 1895.

Attest:
Jos Kneuer
Frank Christie

Inventor.
Alonzo B Arnold
By J. T. M. St. John
Atty

UNITED STATES PATENT OFFICE.

ALONZO B. ARNOLD, OF LE GRAND, IOWA, ASSIGNOR OF ONE-HALF TO D. M. HELFENSTINE, OF SAME PLACE.

FELLY-EXPANDER.

SPECIFICATION forming part of Letters Patent No. 536,167, dated March 19, 1895.

Application filed December 4, 1894. Serial No. 530,823. (No model.)

*To all whom it may concern:*

Be it known that I, ALONZO B. ARNOLD, a citizen of the United States, residing at Le Grand, in the county of Marshall and State of Iowa, have invented certain new and useful Improvements in Felly-Expanders; and I do hereby declare the following to be a full, clear, and exact description of the invention, such as will enable others skilled in the art to which it appertains to make and use the same.

The object of this invention is to provide the felly of a vehicle wheel with means for expanding the same, so as to tighten the tire thereon when it becomes loose, and without the re-setting of the tire. The means by which this result is secured will be hereinafter fully described and claimed, reference being had to the accompanying drawings, forming a part of this specification, in which—

Figure 1:
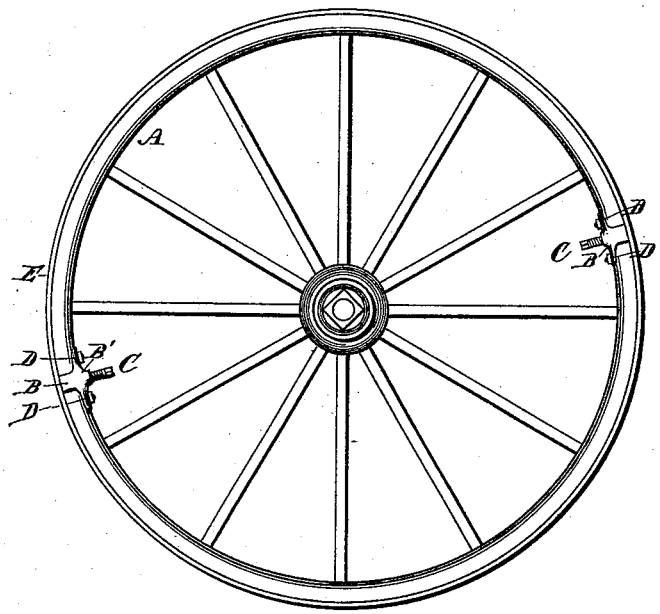
Figure 2:
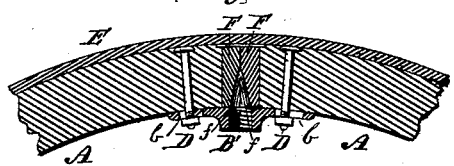
Figure 3:
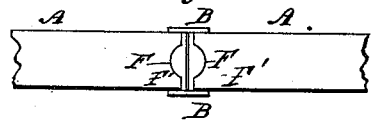
Figure 4:
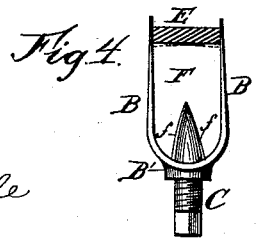

Figure 1 is a side elevation of a wheel with the device embodying my invention attached thereto. Fig. 2 is a central, longitudinal section of the device without the tightening set screw. Fig. 3 is a plan view of the same, without the tire, and before the tangs of the clip are bent over the felly. Fig. 4 is an end elevation of the clip, showing also one of the wedge-plates in position, and a section of the tire.

Similar letters of reference indicate corresponding parts.

The invention is designed to remedy the common difficulty due to the expansion of the tire of a vehicle wheel by heat, and the shrinking of the felly from the same cause whereby the tire becomes loose, runs off, and the wheel, in case the wagon is heavily loaded, is crushed. Hitherto, the usual course has been to re-set the tire, by reducing its diameter and shrinking it on the felly. This is at times inconvenient, inasmuch as the looseness of the tire may not be discovered until the loaded wagon is on the road, or is elsewhere remote from a shop where the tire might be so re-set. This manner of tightening the tire, though almost universally practiced, is also objectionable, for the reason that after the tire has been reduced in size and snugly shrunk on the wheel, a season of wet weather will again tend to swell the felly to its former diameter, and being confined by the tire the wheel takes the only course left it and becomes "dished" to a greater or less extent by the lateral spring of the felly and spokes. This difficulty I propose to obviate by providing the felly with means for expanding it, when the tire expands or the felly shrinks, and for relieving excessive pressure when the felly swells again.

Referring now to the drawings, A designates a two-part felly of an ordinary vehicle wheel. E is the tire thereon. These are of any desired form or construction, and need not be specially described.

To the felly near each joint is attached a clip B by a pair of bolts D D passing through the felly. The side-plates B B of the clip cover the joint in the felly, and when in position the outer ends of these plates are bent over the periphery of the felly, as indicated by the dotted lines in Figs. 3 and 4. The clip is provided with a central boss B', which is screw-threaded to receive a set-screw C. The threaded portion of this set-screw is of uniform diameter, so as to work freely the entire length thereof in the boss B'. The conical point alone bears on the wedge-plates, as will be seen. The holes $b\ b$, through which the attaching bolts pass are slotted endwise of the clip, to allow for the proper spread of the parts of the felly.

Between the abutting ends of the felly are mounted two wedge-plates F F. These are made with a central semicircular portion, as shown in Fig. 3, fitting a corresponding recess in the felly, easily and quickly made by boring. The lateral wings F' F' are preferably extended to the side of the felly, and prevent the wedge-plates from turning. Each of the plates is provided with a semi-conical cavity $f$, extending up from the inner portion of the felly, and corresponding practically to the conical point of the set-screw as shown in Fig. 4. For durability the plates and set-screw should be of suitable hard material, such as tempered or case-hardened steel. The clip B should be of material which will admit of the tangs being easily bent over the felly for convenience in applying it to wheels already in use, though when attached at the wagon factory it is evident that the clip may be completely formed before attaching to the felly. This feature in the construction of the clip is advantageous in more than one respect. It admits of the use of one size of clip for fellies of different radial thickness; secures a perfect fit of the clip on the felly; and provides for the complete covering of the gap between the two parts of the felly, so that there is no unsightly space left either between the parts of the felly, or the felly and the tire.

The operation of the device will be readily understood. To tighten the tire on the felly it is but necessary to loosen the nuts of the bolts D D and then turn up the set-screw C. To ease down excessive pressure, when the felly swells in wet weather, the operation is reversed, that is to say, the nuts are loosened and so is also the set screw. The nuts are of course to be kept normally tight.

Having thus described my invention, I claim—

1. The combination with a wheel felly, of a pair of wedge-plates mounted between the abutting ends of the felly, and having straight lateral wings and semi-circular central portions with semi-conical cavities therein, a conical pointed set-screw engaging with said cavities, and a clip through which said set-screw screws, suitably secured to the felly, substantially as and for the purpose set forth.

2. The combination with a felly, of the wedge-plates F F having cavities $f f$, the clip B B provided with central, screw-threaded boss B' and slots $b\ b$, the pointed set-screw C, and bolts D D, substantially as and for the purpose set forth.

3. As a new article of manufacture the herein described felly expander, consisting of the wedge-plates F F having cavities $f f$, the clip having side-plates B B adapted to be bent over the periphery of the felly at the outer ends, and provided with the screw-threaded boss B' and slots $b\ b$, and the pointed set-screw C.

In testimony whereof I affix my signature in presence of two witnesses.

ALONZO B. ARNOLD.

Witnesses:
JAS. M. SALISBURY,
A. D. BUTLER.